US012792941B2

(12) United States Patent
On et al.

(10) Patent No.: US 12,792,941 B2
(45) Date of Patent: Nov. 10, 2026

(54) LOGICAL QUBIT EXECUTION APPARATUS AND METHOD

(71) Applicant: ELECTRONICS AND TELECOMMUNICATIONS RESEARCH INSTITUTE, Daejeon (KR)

(72) Inventors: Jin-Ho On, Sejong-si (KR); Chei-Yol Kim, Sejong-si (KR); Soo-Cheol Oh, Daejeon (KR); Sang-Min Lee, Daejeon (KR); Gyu-Il Cha, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 727 days.

(21) Appl. No.: 18/345,635

(22) Filed: Jun. 30, 2023

(65) Prior Publication Data

US 2024/0127094 A1 Apr. 18, 2024

(30) Foreign Application Priority Data

Sep. 30, 2022 (KR) ........................ 10-2022-0125130

(51) Int. Cl.
*G06N 10/20* (2022.01)
*G06N 10/40* (2022.01)
*G06N 10/70* (2022.01)

(52) U.S. Cl.
CPC ............ *G06N 10/20* (2022.01); *G06N 10/70* (2022.01); *G06N 10/40* (2022.01)

(58) Field of Classification Search
CPC ......... G06N 10/20; G06N 10/40; G06N 10/70
See application file for complete search history.

(56) References Cited

U.S. PATENT DOCUMENTS

| | | | |
|---|---|---|---|
| 9,690,042 B2 | 6/2017 | Kim et al. | |
| 10,956,830 B1 | 3/2021 | Rigetti et al. | |
| 12,165,006 B1 * | 12/2024 | Chamberland | ........ G06N 10/20 |
| 2019/0244128 A1 | 8/2019 | Choi et al. | |

(Continued)

OTHER PUBLICATIONS

Chamberland and Campbell, Universal Quantum Computing with Twist-Free and Temporally Encoded Lattice Surgery, Feb. 2022 (Year: 2022).*

(Continued)

*Primary Examiner* — Tamara T Kyle
*Assistant Examiner* — Jacqueline C. Meyer
(74) *Attorney, Agent, or Firm* — KILE PARK REED & HOUTTEMAN PLLC

(57) ABSTRACT

Disclosed herein are a logical qubit execution apparatus and method. The logical qubit execution apparatus may be configured to execute, by a logical execution layer, a quantum circuit including requested logical qubits using a lattice surgery operation, generate, by the logical execution layer, measurement results of the logical qubits by combining measurement results of logical Pauli frames, generate, by a physical execution layer, a physical qubit circuit by converting a logical qubit operation corresponding to the measurement results of the logical qubits into a physical qubit operation, and measure, by the physical execution layer, results of an operation on physical Pauli frames by executing the physical qubit circuit.

10 Claims, 9 Drawing Sheets

(56) References Cited

U.S. PATENT DOCUMENTS

| | | | | |
|---|---|---|---|---|
| 2021/0064350 | A1 | 3/2021 | Cao | |
| 2021/0224150 | A1 | 7/2021 | Zheng et al. | |
| 2021/0374588 | A1* | 12/2021 | Gidney | G06F 11/004 |
| 2022/0164253 | A1 | 5/2022 | On et al. | |
| 2022/0382626 | A1* | 12/2022 | Fowler | G06F 11/1044 |

OTHER PUBLICATIONS

Lao et al., Mapping of Lattice Surgery-based Quantum Circuits on Surface Code Architecture, May 2018 (Year: 2018).*

On et al., A multilayered Pauli tracking architecture for lattice surgery-based logical qubits, Jun. 2022 (Year: 2022).*

Vuillot et al., Code Deformation and Lattice Surgery are Guage Fixing, Nov. 2018 (Year: 2018).*

Riesebos et al., Pauli Frames for Quantum Computer Architectures, 2017 (Year: 2017).*

Chamberland et al., Fault-Tolerant Quantum Computing in the Pauli or Clifford Frame with Slow Error Diagnostics, Dec. 2017 (Year: 2017).*

Litinski and von Oppen, Lattice Surgery with a Twist: Simplifying Clifford Gates of Surface Codes, Apr. 2018 (Year: 2018).*

Litinski, A Game of Surface Codes: Large-Scale Quantum Computing with Lattice Surgery, Feb. 2019 (Year: 2019).*

Xiang Fu et al., "A Control Microarchitecture for Fault-Tolerant Quantum Computing," Microprocessors and Microsystems, Jul. 2019, vol. 70, Elsevier, Netherlands.

Austin G. Fowler et al., "Surface Codes: Towards Practical Large-Scale Quantum Computation," Physical Review A, Sep. 18, 2012, vol. 86, No. 3, American Physical Society (APS), United States.

Scott Aaronson et al., "Improved Simulation of Stabilizer Circuits," Physical Review A, Nov. 30, 2004, vol. 70, No. 5, American Physical Society (APS), United States.

* cited by examiner

LOGICAL QUBIT EXECUTION APPARATUS AND METHOD

CROSS REFERENCE TO RELATED APPLICATION

This application claims the benefit of Korean Patent Application No. 10-2022-0125130, filed Sep. 30, 2022, which is hereby incorporated by reference in its entirety into this application.

BACKGROUND OF THE INVENTION

1. Technical Field

The present disclosure relates to technology for efficiently running and controlling a quantum computer that supports logical qubits.

2. Description of the Related Art

Quantum computing is new technology that is capable of solving complex problems of existing computers by utilizing quantum bit (qubit) operations based on quantum phenomena. Physical qubits undergo interactions with surrounding environments during a process of performing quantum computing operations, and these interactions may result in the loss of qubit information, thus causing errors.

For superconducting qubits, the time available for performing quantum operations without errors is extremely short on the order of microseconds (μs), and thus there is a need to essentially introduce a method of extending the operation time using an error correction technique.

Among error correction methods for improving the reliability of qubits, a surface code method of configuring a logical qubit through entanglement of multiple physical qubits has been proposed. However, the surface code is problematic in that a large amount of overhead occurs in the process of encoding physical qubits into logical qubits and performing operations. Due to such a problem, there is a need to reduce the number of logical qubits that are generated and then minimize the number of operations on physical qubits to be executed by a control system.

As a representative logical operation method for the surface code, a lattice surgery method is present.

Meanwhile, U.S. Patent Application Publication No. US2022/0164253 entitled "Quantum Computing System and Operation Method thereof" discloses a method for effectively operating the quantum computing system by separating the quantum computing system into multiple layers.

SUMMARY OF THE INVENTION

Accordingly, the present disclosure has been made keeping in mind the above problems occurring in the prior art, and an object of the present disclosure is to minimize an error rate in the operation execution process of a quantum computer.

Another object of the present disclosure is to minimize a system overhead occurring when physical qubits are encoded into logical qubits.

A further object of the present disclosure is to provide a system architecture for multi-layering Pauli frames and a control method for effectively operating the system architecture.

Yet another object of the present disclosure is to provide an efficient software operating layer for quantum computing operations.

In accordance with an aspect of the present disclosure to accomplish the above objects, there is provided a logical qubit execution apparatus, including one or more processor, and execution memory configured to store at least one program that is executed by the one or more processors, wherein the at least one program is configured to execute, by a logical execution layer, a quantum circuit including requested logical qubits using a lattice surgery operation, generate, by the logical execution layer, measurement results of the logical qubits by combining measurement results of logical Pauli frames, generate, by a physical execution layer, a physical qubit circuit by converting a logical qubit operation corresponding to the measurement results of the logical qubits into a physical qubit operation, and measure, by the physical execution layer, results of an operation on physical Pauli frames by executing the physical qubit circuit.

The lattice surgery operation may include a first operation group for performing merge and split operations and a second operation group, execution or non-execution of which is determined based on a result of execution of the first operation group.

The at least one program may be configured to, when execution of a Clifford operation is requested from the second operation group, determine whether a Pauli operation stored in the Pauli frames is present, and request the physical execution layer to execute the first operation group when it is determined that no Pauli operation is present in the Pauli frames.

The at least one program may be configured to, when it is determined that the Pauli operation is present in the Pauli frames, delay execution of the Pauli operation based on a preset Pauli frame composition rule between the Pauli operation and the Clifford operation.

The at least one program may be configured to change an execution priority of the Pauli operation to a priority lower than that of the Clifford operation and then delay execution of the Pauli operation.

The at least one program may be configured to convert measurement results of physical qubits into measurement results of logical qubits based on operation results of the physical Pauli frames in the physical execution layer.

The at least one program may be configured to store the operation on the physical Pauli frames as a Pauli operation of the logical Pauli frame based on the converted measurement results of the logical qubits.

In accordance with another aspect of the present disclosure to accomplish the above objects, there is provided a logical qubit execution method being performed by a logical qubit execution apparatus, the logical qubit execution method including executing, by a logical execution layer, a quantum circuit including requested logical qubits using a lattice surgery operation, generating, by the logical execution layer, measurement results of the logical qubits by combining measurement results of logical Pauli frames, generating, by a physical execution layer, a physical qubit circuit by converting a logical qubit operation corresponding to the measurement results of the logical qubits into a physical qubit operation, and measuring, by the physical execution layer, results of an operation on physical Pauli frames by executing the physical qubit circuit.

The lattice surgery operation may include a first operation group for performing merge and split operations and a second operation group, execution or non-execution of which is determined based on a result of execution of the first operation group.

Executing the quantum circuit may include, when execution of a Clifford operation is requested from the second operation group, determining whether a Pauli operation stored in the Pauli frames is present, and requesting the physical execution layer to execute the first operation group when it is determined that no Pauli operation is present in the Pauli frames.

Executing the quantum circuit may further include, when it is determined that the Pauli operation is present, delaying execution of the Pauli operation based on a preset Pauli frame composition rule between the Pauli operation and the Clifford operation.

Executing the quantum circuit may further include changing an execution priority of the Pauli operation to a priority lower than that of the Clifford operation and then delaying execution of the Pauli operation.

The logical qubit execution method may further include converting measurement results of physical qubits into measurement results of logical qubits based on operation results of the physical Pauli frames in the physical execution layer.

Converting the measurement results may include store the operation on the physical Pauli frames as a Pauli operation of the logical Pauli frame based on the converted measurement results of the logical qubits.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Figure 1:
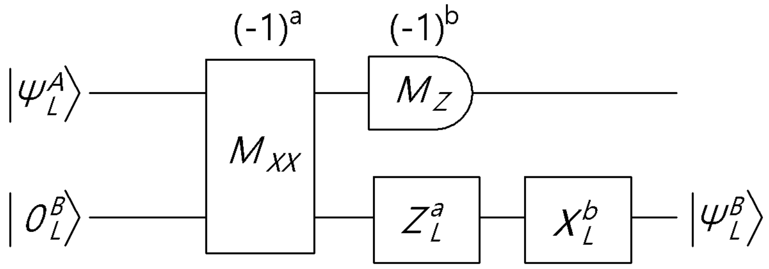
FIG. 1 is a diagram illustrating a lattice surgery operation according to an embodiment of the present disclosure.

The present disclosure will be described in detail below with reference to the accompanying drawings. Repeated descriptions and descriptions of known functions and configurations which have been deemed to make the gist of the present disclosure unnecessarily obscure will be omitted below. The embodiments of the present disclosure are intended to fully describe the present disclosure to a person having ordinary knowledge in the art to which the present disclosure pertains. Accordingly, the shapes, sizes, etc. of components in the drawings may be exaggerated to make the description clearer.

In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Hereinafter, embodiments of the present disclosure will be described in detail with reference to the attached drawings.

FIG. 1 is a diagram illustrating a lattice surgery operation according to an embodiment of the present disclosure.

Referring to FIG. 1, it can be seen that, as a representative logical operation method for surface code, an example of the lattice surgery operation is illustrated.

The lattice surgery operation may enable various operations to be performed on a logical qubit through measurement operations, such as Mxx and Mz operations, and correction operations on measurement results.

Qubit operators in quantum computing according to an embodiment of the present disclosure may perform all operations using several universal operators (gates).

Therefore, quantum computing may provide a minimum number of universal gates through the lattice surgery operation, and may execute an input quantum circuit through the universal gates. Such representative universal gates may include Pauli operators (Pauli-X, Y, and Z), Clifford operators (H, S), and a non-Clifford operator (T).

All Pauli operators (gates) may delay execution as long as they do not encounter non-Clifford operators during execution, and a classical computer may rapidly track the state of this delay.

The present disclosure may use Pauli frames so as to effectively process Pauli operations in consideration of the characteristics of such quantum operations.

Operation application rules for the Pauli frames may be represented in the following Table 1:

TABLE 1

| Gates | Rules |
|---|---|
| H | $X \rightarrow Z$ |
| | $Z \rightarrow X$ |
| S | $X \rightarrow Y$ |
| | $Z \rightarrow Z$ |
| CNOT | $X \otimes I \rightarrow X \otimes X$ |
| | $I \otimes X \rightarrow I \otimes X$ |
| | $Z \otimes I \rightarrow Z \otimes I$ |
| | $I \otimes Z \rightarrow Z \otimes Z$ |

The Pauli frames may be effectively processed through parallel processing of error syndrome measurement and quantum error decoding (error correction decoding).

Although the Pauli frames may provide various advantages in quantum computing, the following problems may occur depending on the scheme for applying the Pauli frames.

When the Pauli frames are present only in a physical layer, one Pauli operation is processed as physical operations corresponding to the code distance of the surface code. Therefore, when the code distance is increased to reduce the error rate, the number of Pauli frames in the physical layer to be simultaneously processed may increase exponentially.

The lattice surgery operation may be performed such that operations using joint measurement are performed first, and suitable logical Pauli operations are performed last, thus completing logical operations.

All logical operation tasks may each include one or more logical Pauli operations that can be effectively tracked and processed using the Pauli frames in the logical layer.

Because the logical layer may process all logical Pauli operations, the physical layer may be operated only through the Pauli frames in the physical layer to perform error correction.

Figure 2:
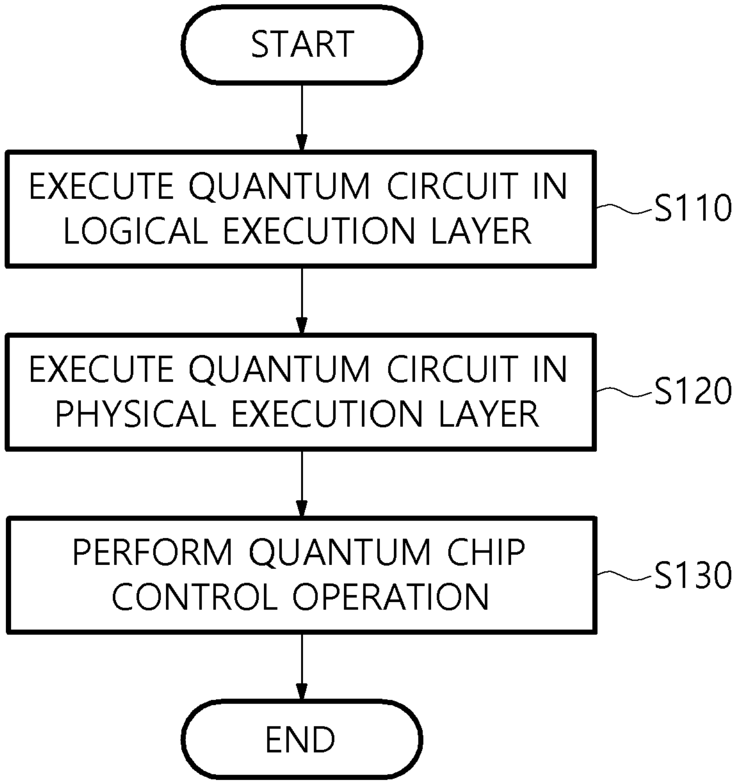
FIG. 2 is an operation flowchart illustrating a logical qubit execution method according to an embodiment of the present disclosure.

FIG. 2 is an operation flowchart illustrating a logical qubit execution method according to an embodiment of the present disclosure.

Referring to FIG. 2, the logical qubit execution method according to the embodiment of the present disclosure may execute a quantum circuit in a logical execution layer 210 according to an embodiment of the present disclosure at step S110.

That is, at step S110, a logical qubit execution controller 211 may execute a quantum circuit composed of logical qubits using a lattice surgery operation.

At step S110, a quantum circuit executer 201 may analyze a quantum circuit 200 received from an external system, and may request the logical execution layer 210 to execute the quantum circuit 200.

At step S110, a logical qubit execution flow determiner 212 may classify the execution type of a requested logical operator, as shown in classification of Table 2, and may determine processing flows in conformity with respective flows.

Here, at step S110, when the tracking of logical Pauli frames is required, the logical qubit execution flow determiner 212 may request a logical layer Pauli frame unit 213*b* to execute the Pauli frames.

Here, at step S110, a logical measurement unit 213*a* may combine information about the Pauli frames with measurement results, thus generating measurement results of the logical qubits.

At step S110, the logical layer Pauli frame unit 213*b* may store and manage Pauli operations for respective logical qubits.

Here, at step S110, a measurement result converter 214 may convert the results of execution by a physical qubit execution optimizer 225 into information usable in the logical execution layer 210.

Next, the logical qubit execution method according to the embodiment of the present disclosure may execute a quantum circuit in a physical execution layer 220 at step S120.

That is, at step S120, an error correction controller 221 may generate a physical qubit circuit for error syndrome measurement (ESM) requested by the logical qubit execution controller 211 and a physical qubit execution controller 222, and may request a quantum chip control device 230 to execute the physical qubit circuit.

Here, at step S120, the physical qubit circuit may be generated based on the measurement results of the logical qubits, and the execution of the physical qubit circuit may be requested from the quantum chip control device 230.

That is, at step S120, the physical qubit execution controller 222 may convert a requested logical operation into a series of physical qubit operations, and may request a physical qubit execution flow determiner 224 to execute the physical qubit operations.

Here, at step S120, an error information decoder 223 may determine an error using the results of syndrome measurement and generate physical qubit operations for error correction.

In this case, at step S120, the physical qubit execution flow determiner 224 may identify the type of each physical qubit operation, and may request the quantum chip device 230 or a physical layer Pauli frame unit 225*b* to execute the physical qubit operation depending on the identified type of execution of the physical qubit operation.

Here, at step S120, when measurement of physical qubits is requested, a physical measurement unit 225*a* may combine the results of actual measurement with the results of measurement of Pauli frames in the physical layer, and may transfer the results of combination to an upper layer.

Here, at step S120, the physical layer Pauli frame unit 225*b* may function to track physical Pauli operations.

Each of the logical execution layer 210 and the physical execution layer 220 may include a separate Pauli frame module to effectively execute a quantum circuit, and may track the flow of Pauli operations on logical/physical qubits in each layer through the corresponding Pauli frame module.

It can be seen that Table 2 shows a processing scheme for executing lattice surgery operations included in the quantum circuits of the logical execution layer 210 and the physical execution layer 220.

TABLE 2

| Type | Gates | Approach |
|---|---|---|
| Pauli | $I_L$, $X_L$, $Z_L$, $Y_L$ | States of all Pauli operations are tracked/managed in Pauli frames |
| Clifford | $H_L$ | After joint-measurement, one logical operator generates additional |
| | $CNOT_L$ | Pauli operation based on measurement results, and additional Pauli operation is managed in Pauli frames |
| | $S_L$ | $\mid A_L\rangle$ state is prepared through magic state distillation, and after $CNOT_L$ operation is performed, Pauli operation is generated based on measurement results and is stored and managed in Pauli frames |
| Non-Clifford | $T_L$ | $\mid Y_L\rangle$ state is prepared through magic state distillation, and after $CNOT_L$ operation is performed, $S_L$ operation is performed based on measurement results |

Next, the logical qubit execution method according to the embodiment of the present disclosure may execute a quantum chip control operation at step S130.

Figure 3:
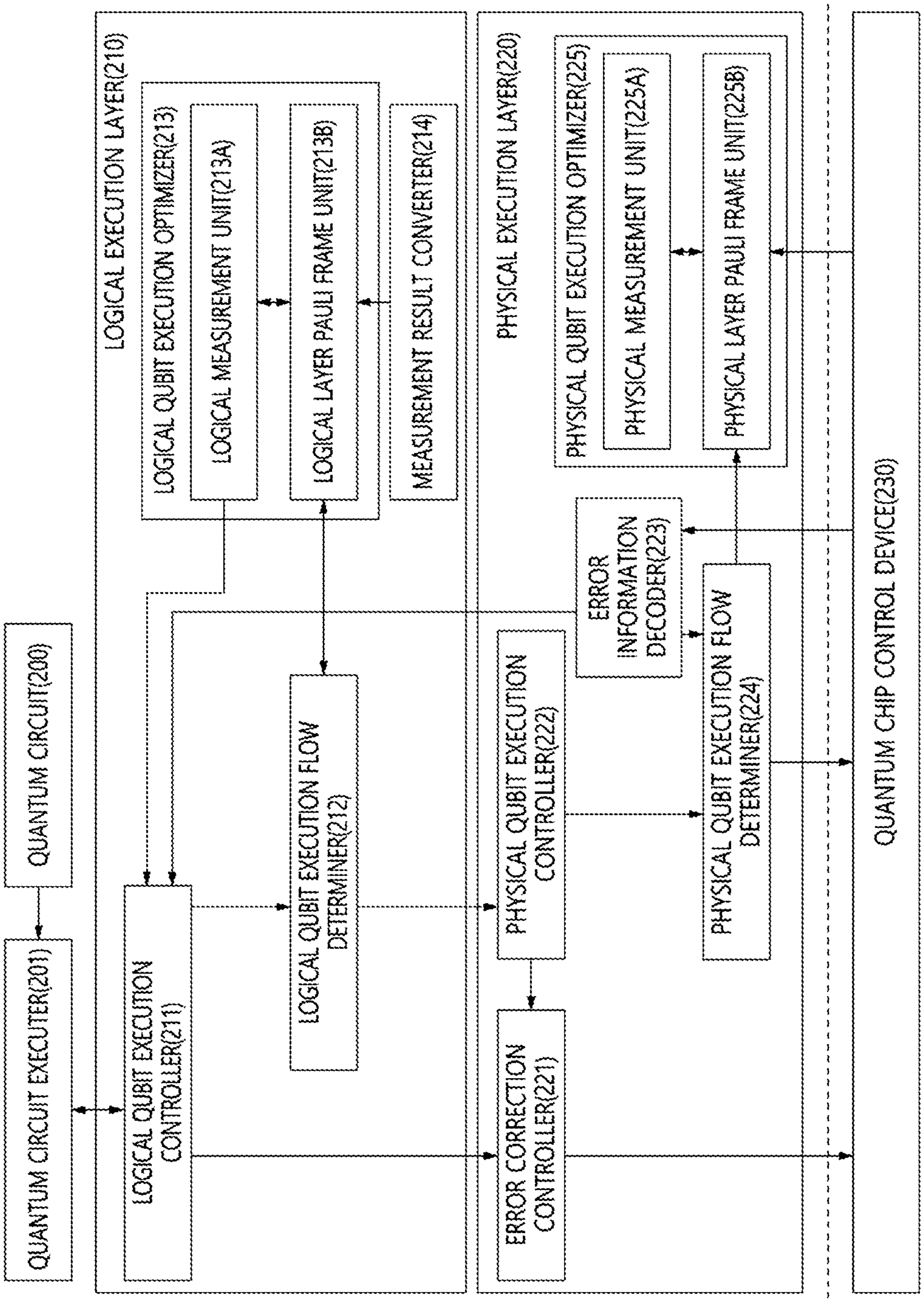
FIG. 3 is a block diagram illustrating a logical qubit execution apparatus according to an embodiment of the present disclosure.

FIG. 3 is a block diagram illustrating a logical qubit execution apparatus according to an embodiment of the present disclosure.

Referring to FIG. 3, the logical qubit execution apparatus according to the embodiment of the present disclosure may include a quantum circuit executor 201, a logical execution layer 210, a physical execution layer 220, and a quantum chip control device 230.

The quantum circuit executer 201 may analyze a quantum circuit 200 received from an external system, and may request the logical execution layer 210 to execute the quantum circuit 200.

The logical execution layer 210 may include a logical qubit execution controller 211, a logical qubit execution flow determiner 212, a logical qubit execution optimizer 213, and a measurement result converter 214.

The logical qubit execution controller 211 may execute a quantum circuit composed of logical qubits using a lattice surgery operation method.

The logical qubit execution flow determiner 212 may classify the execution type of a requested logical operator, as shown in classification of Table 2, and may determine processing flows in conformity with respective flows.

Here, when the tracking of logical Pauli frames is required, the logical qubit execution flow determiner 212 may request a logical layer Pauli frame unit 213*b* to execute the Pauli frames.

The logical qubit execution optimizer 213 may include a logical measurement unit 213*a* and the logical layer Pauli frame unit 213*b*.

The logical measurement unit 213*a* may combine information about the Pauli frames with measurement results, thus generating measurement results of the logical qubits.

The logical layer Pauli frame unit 213*b* may store and manage Pauli operations for respective logical qubits.

The measurement result converter 214 may convert the results of execution by a physical qubit execution optimizer 225 into information usable in the logical execution layer 210.

The physical execution layer 220 may include an error correction controller 221, a physical qubit execution controller 222, an error information decoder 223, a physical qubit execution flow determiner 224, and the physical qubit execution optimizer 225.

The error correction controller 221 may generate a physical qubit circuit for error syndrome measurement (ESM) requested by the logical qubit execution controller 211 and a physical qubit execution controller 222, and may request a quantum chip control device 230 to execute the physical qubit circuit.

That is, The physical qubit execution controller 222 may convert a requested logical operation into a series of physical qubit operations, and may request a physical qubit execution flow determiner 224 to execute the physical qubit operations.

The error information decoder 223 may determine an error using the results of syndrome measurement and generate physical qubit operations for error correction.

The physical qubit execution flow determiner 224 may identify the type of each physical qubit operation, and may request the quantum chip device 230 or a physical layer Pauli frame unit 225*b* to execute the physical qubit operation depending on the identified type of execution of the physical qubit operation.

The physical qubit execution optimizer 225 may include a physical measurement unit 225*a* and a physical layer Pauli frame unit 225*b*.

When measurement of physical qubits is requested, the physical measurement unit 225*a* may combine the results of actual measurement with the results of measurement of Pauli frames in the physical layer, and may transfer the results of combination to an upper layer.

The physical layer Pauli frame unit 225*b* may function to track a physical Pauli operation.

The quantum chip control device 230 may be a physical qubit control device based on various qubit-based technologies.

Figure 4:
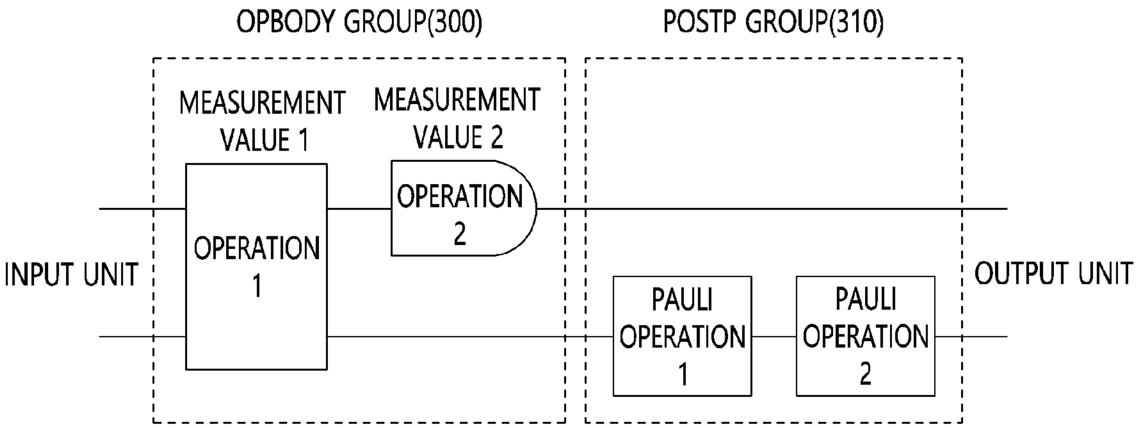
FIG. 4 is a diagram illustrating an H operation, which is one of Clifford operations, in the form of a lattice surgery operation according to an embodiment of the present disclosure.

FIG. 4 is a diagram illustrating an H operation, which is one of Clifford operations, in the form of a lattice surgery operation according to an embodiment of the present disclosure.

Referring to FIG. 4, one lattice surgery-based logical operation may include a first operation group OPBODY 300 for performing merge/split operations, and a second operation group POSTP 310, the execution or non-execution of which is determined based on the results of execution of the first operation group.

Figure 5:
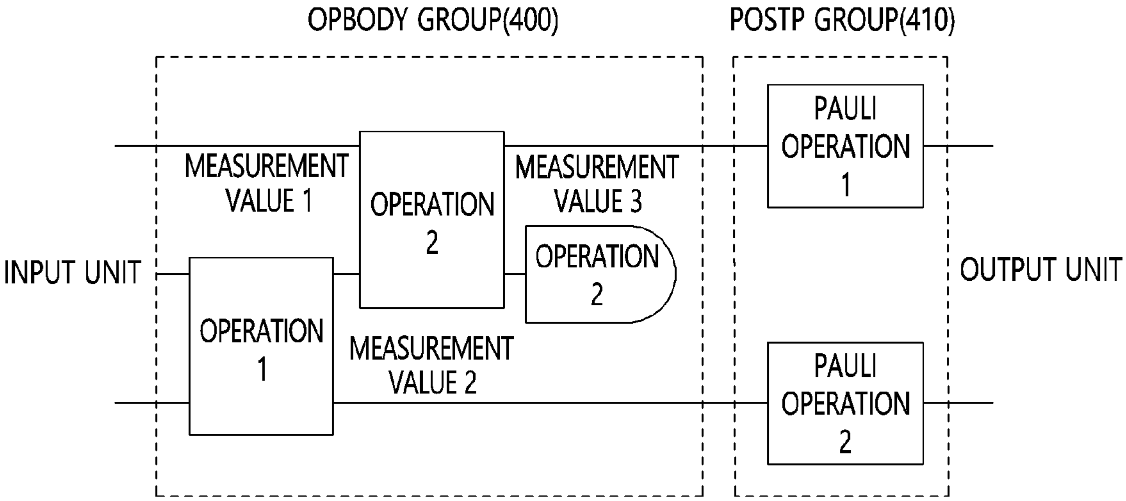
FIG. 5 is a diagram illustrating a CNOT operation, which is one of the Clifford operations, in the form of a lattice surgery operation according to an embodiment of the present disclosure.

FIG. 5 is a diagram illustrating a CNOT operation, which is one of the Clifford operations, in the form of a lattice surgery operation according to an embodiment of the present disclosure.

Referring to FIG. 5, a lattice surgery-based Clifford operation may include a first operation group OPBODY 400 for performing merge/split operations, and a second operation group POSTP 410, the execution or non-execution of which is determined based on the results of execution of the first operation group.

It can be seen that the OPBODY group is a command unconditionally requested to be executed by the logical qubit execution flow determiner 212 from the physical execution layer 220.

It can be seen that the execution or non-execution of the POSTP group is determined based on the results of execution of the OPBODY group.

When the execution of the POSTP group is determined based on the results of execution, the POSTP group may be integrated with a previous operator stored in the logical layer Pauli frame unit 213*b*.

When the execution of the Clifford operation is requested, the logical layer Pauli frame unit may determine whether there is any stored Pauli operation.

When it is determined that no Pauli operation is present, the OPBODY group of the Clifford operation is immediately requested to be executed from the physical execution layer 220, and the POSTP group may not be executed, or may be stored in the Pauli frames depending on the results of execution of the OPBODY group.

When any Pauli operation is present, the Pauli operation of the POSTP group may be delayed to be executed based on the Pauli frame composition rule between the corresponding Pauli operation and the Clifford operation, as shown in the example of CNOT operation in Table 3.

Thereafter, the execution of the OPBODY group may be requested from the physical layer.

Based on the results of execution, a new operation into which the POSTP group and the previous Pauli operation are integrated with each other may be stored in the Pauli frames.

Figure 6:
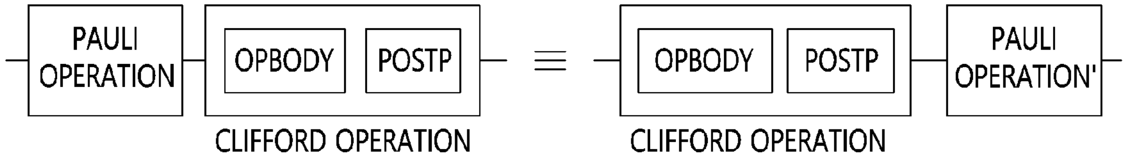
FIGS. 6 to 8 are diagrams illustrating a process in which Pauli and Clifford operations are combined and converted into an additional operation based on composition rules according to an embodiment of the present disclosure.
Figure 7:
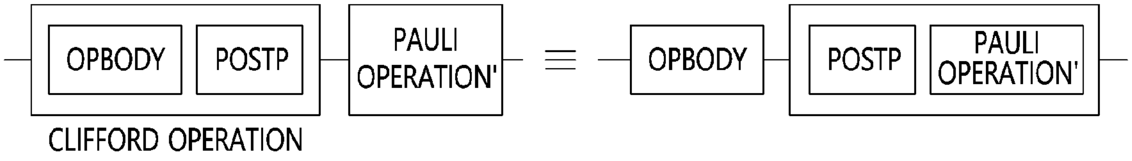
Figure 8:
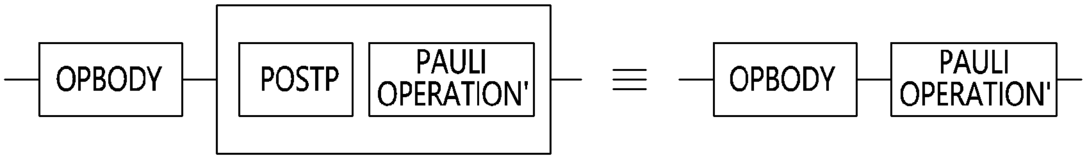

FIGS. 6 to 8 are diagrams illustrating a process in which Pauli and Clifford operations are combined and converted into an additional operation based on composition rules according to an embodiment of the present disclosure.

Referring to FIGS. 6 to 8, a process of optimizing the Pauli operation and the Clifford operation is illustrated.

Referring to FIG. 6, it can be seen that, when the Pauli operation encounters the Clifford operation, the Pauli operation at a position present before the Clifford operation (on the left side of the drawing) is moved to a position after the Clifford operation (on the right side of the drawing), whereby the Pauli operation is converted into another Pauli operation' and the execution thereof is delayed.

Here, the execution priority of the Pauli operation may be changed to priority lower than that of the Clifford operation, whereby the execution of the Pauli operation is delayed.

Referring to FIG. 7, the Pauli operation', moved to the position after the Clifford operation in FIG. 6, may be integrated with the POSTP group in the Clifford operation.

Referring to FIG. 8, the Pauli operation' integrated with the POSTP group in FIG. 7 may be finally converted into a new Pauli operation", and the new Pauli operation" may be stored in the Pauli frames without being executed.

Table 3 shows examples (CNOT) of the composition rule between the Pauli POSTP group and the Pauli operation stored in the Pauli frames.

TABLE 3

| $C_{in}$ | $T_{in}$ | $C_{out}$ | $T_{out}$ |
|---|---|---|---|
| $X_L$ | $I_L$ | $X_L Z_L^{a+c}\|\psi_L\rangle$ | $X_L X_L^{b}\|\psi_L\rangle = X_L^{b+1}\|\psi_L\rangle$ |
| $I_L$ | $X_L$ | $I_L Z_L^{a+c}\|\psi_L\rangle$ | $X_L X_L^{b}\|\psi_L\rangle = X_L^{b+1}\|\psi_L\rangle$ |
| $Z_L$ | $I_L$ | $Z_L Z_L^{a+c}\|\psi_L\rangle = Z_L^{a+c}\|\psi_L\rangle$ | $I_L X_L^{b}\|\psi_L\rangle$ |
| $I_L$ | $Z_L$ | $Z_L Z_L^{a+c}\|\psi_L\rangle = Z_L^{a+c}\|\psi_L\rangle$ | $Z_L X_L^{b}\|\psi_L\rangle$ |

Variables a, b, and c in Table 3 denote measurement values 1, 2, and 3 in FIG. 5. The same rule may be generated even for other commands (e.g., Move, H, CNOT, S, T, and Magic State Distillation) included in lattice surgery-based universal operators (gates), and, and various rules may be defined even for the same operation depending on the circuit configuration.

Figure 9:
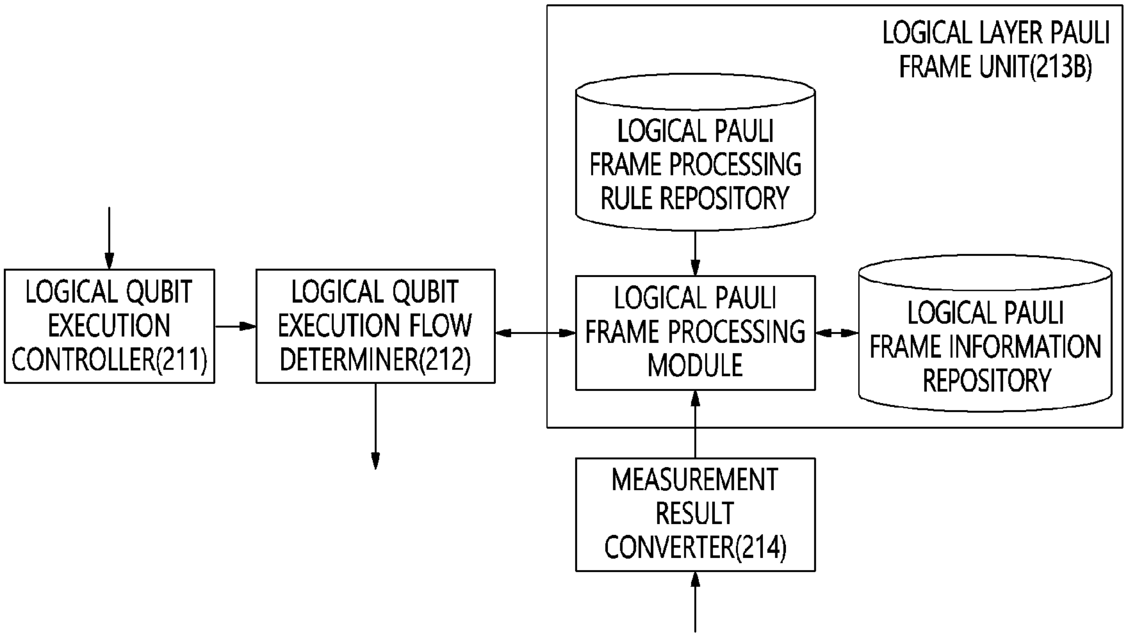
FIG. 9 is a diagram illustrating a process of executing Pauli frames in a logical layer according to an embodiment of the present disclosure.

FIG. 9 is a diagram illustrating a process of executing Pauli frames in a logical layer according to an embodiment of the present disclosure.

Referring to FIG. 9, a logical layer Pauli frame unit 213*b* may include a logical Pauli frame information repository and a logical Pauli frame processing rule repository which can internally store the states of respective logical qubits in a Pauli operation.

The logical Pauli frame processing rule repository may include rules for splitting a lattice surgery operation and applying Pauli frames to the split lattice surgery operations, as shown in the examples of Table 3.

Table 4 may show a method of executing logical qubits in a logical layer.

TABLE 4

| Operations | Execution steps |
|---|---|
| $\|0_L\rangle$ initialization | 1. initialize target qubit to $\|0_L\rangle$<br>2. initialize all physical qubits constituting target logical qubit to $\|0\rangle$<br>3. initialize target logical qubit in Pauli frames to $I_L$ state<br>4. initialize all physical qubits constituting target logical qubit in physical Pauli frames to 1 state |
| Measurement | 1. perform measurement on target physical qubit<br>2. correct physical qubit measurement value through results stored in target physical qubit in Pauli frames<br>3. convert results of physical Pauli frames into logical qubit measurement values<br>4. correct measured logical results based on results stored in logical Pauli frames |
| Pauli operation | 1. correct corresponding logical qubit in Pauli frames |
| Clifford operation | 1. split corresponding operation into OPBODY and POSTP groups<br>2. search for Pauli frames corresponding to target logical qubit<br>3. transmit OPBODY group of operation to physical layer and execute OPBODY group<br>4. generate and store Pauli frames based on execution results |
| Non-Clifford operation | 1. transmit all values stored in Pauli frames for target logical qubit to physical layer and execute target logical qubit<br>2. request physical layer to execute non-Clifford operation |

Figure 10:
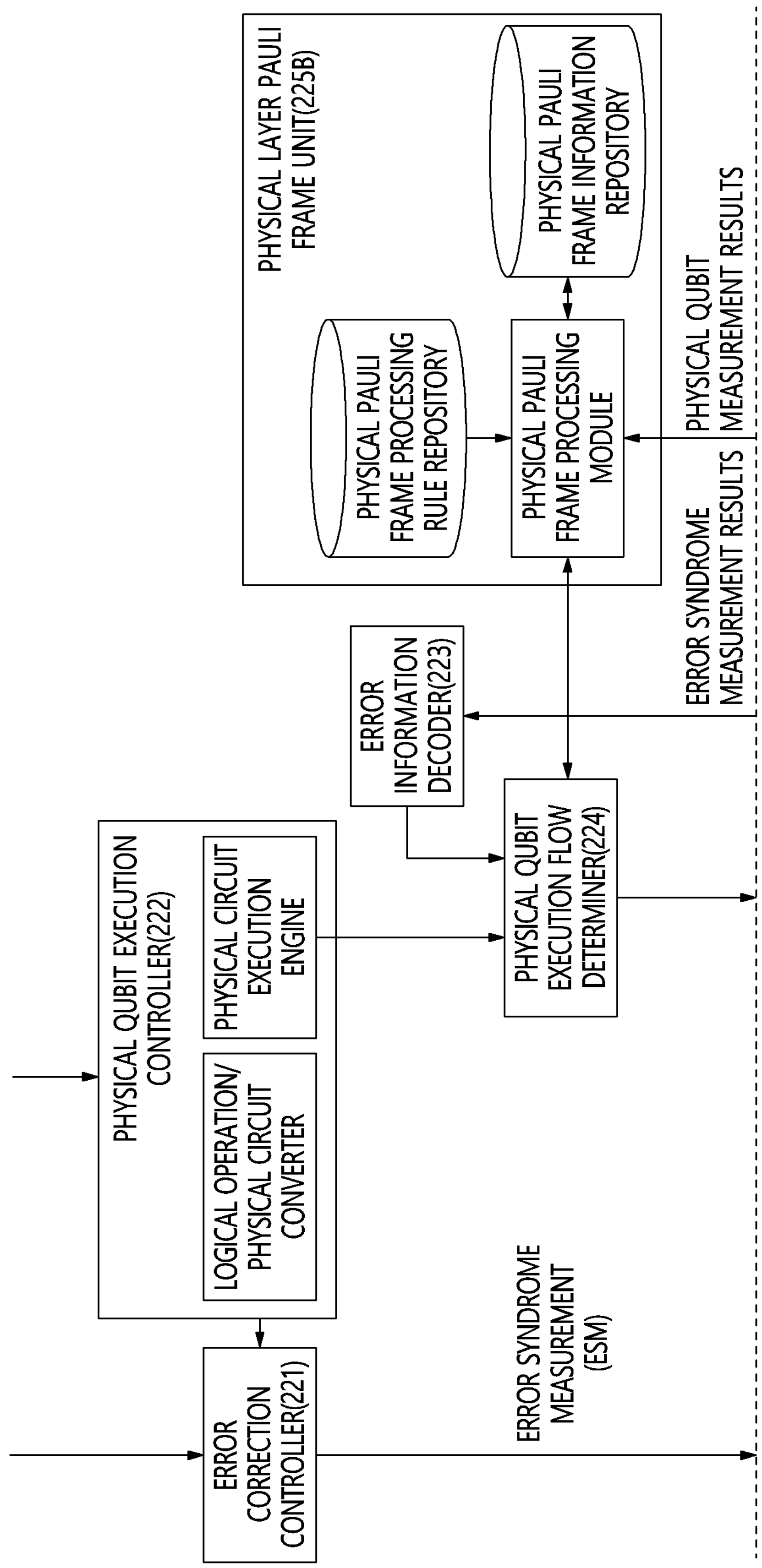
FIG. 10 is a diagram illustrating a process of executing Pauli frames in a physical layer according to an embodiment of the present disclosure.

FIG. 10 is a diagram illustrating a process of executing Pauli frames in a physical layer according to an embodiment of the present disclosure.

Referring to FIG. 10, an error correction controller 221 may generate an error syndrome measurement command for error correction in the physical layer.

When syndrome measurement is completed, an error information decoder 223 may analyze the measured syndrome, generate a Pauli operation for error correction, and request a physical qubit execution flow determiner 224 to execute the Pauli operation.

A physical layer Pauli frame unit 225*b* may include a Pauli frame information repository and a processing rule repository, which store the states of respective physical qubits so as to process Pauli frames.

Table 5 may show a method of executing physical qubits in a physical layer.

TABLE 5

| Operations | Execution steps |
|---|---|
| $\|0\rangle$ initialization | 1. initialize target qubit to $\|0\rangle$<br>2. initialize target qubit of Pauli frames to I value |
| Measurement | 1. measure target qubit<br>2. generate measurement results by applying internal values of Pauli frames to measurement results |
| Pauli operation | 1. correct corresponding qubit value in Pauli frames |
| Clifford operation | 1. incorporate correction of Pauli frames into qubit value stored in Pauli frames and store incorporated results<br>2. apply Clifford operation to target qubit |
| Non-Clifford operation | 1. execute stored operation on target qubit in Pauli frames<br>2. execute non-Clifford operation on target physical qubit |

Figure 11:
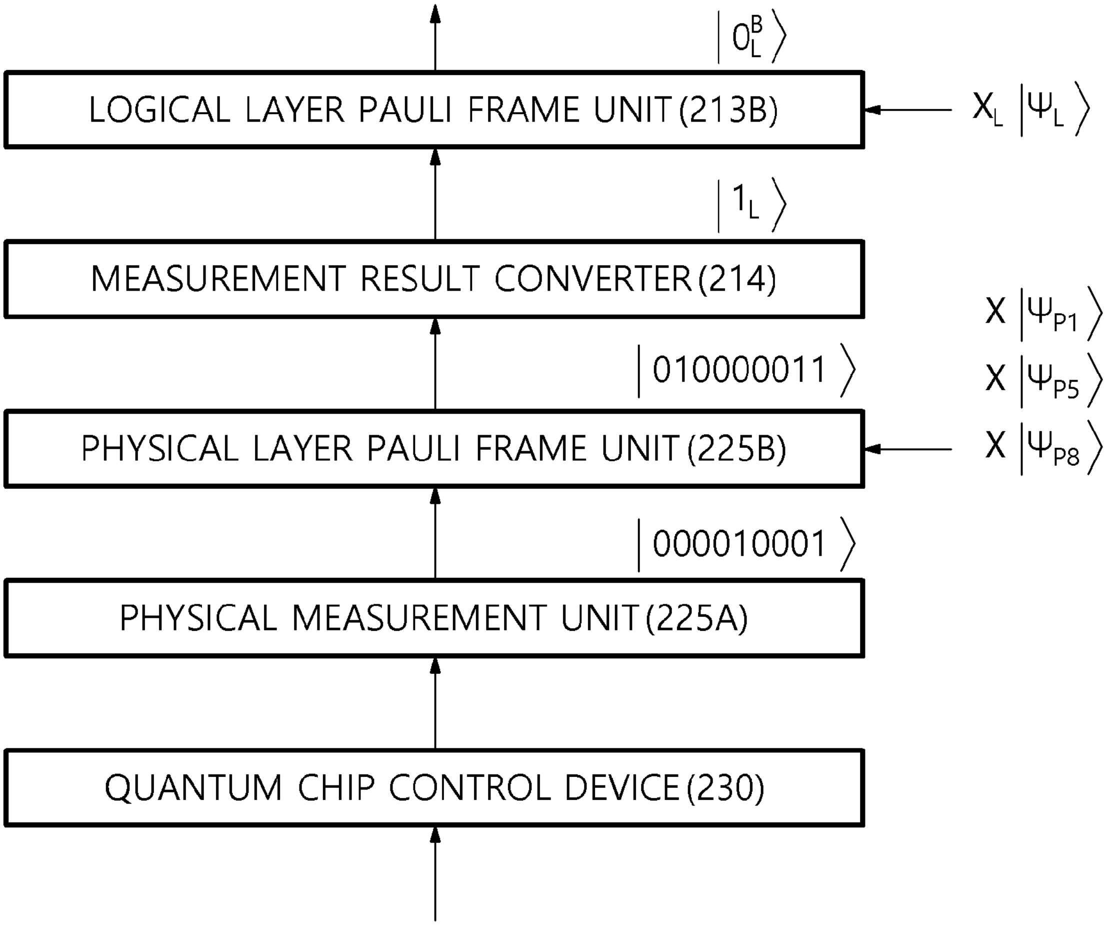
FIG. 11 is a diagram illustrating a conversion process for generating the measurement results of logical qubits according to an embodiment of the present disclosure.

FIG. 11 is a diagram illustrating a conversion process for generating the measurement results of logical qubits according to an embodiment of the present disclosure.

Referring to FIG. 11, the logical qubit execution apparatus according to an embodiment of the present disclosure may correct measurement results for a logical layer and a physical layer when a quantum circuit which is separated into and operated by the logical layer and the physical layer is executed.

First, a physical measurement unit 225*a* may measure physical qubits in response to the request of a quantum chip control device 230.

A physical layer Pauli frame unit 225*b* may correct the measurement results of the physical qubits based on a prestored operation.

A measurement result converter 214 may determine the measurement value of the logical qubit depending on the measurement results of all physical qubits constituting the logical qubit.

A logical layer Pauli frame unit 213*b* may store and manage Pauli operations for respective logical qubits.

The values of physical/logical qubits illustrated in FIG. 11 may be values for explaining a data conversion process, and may be represented differently depending on various components forming surface code.

Figure 12:
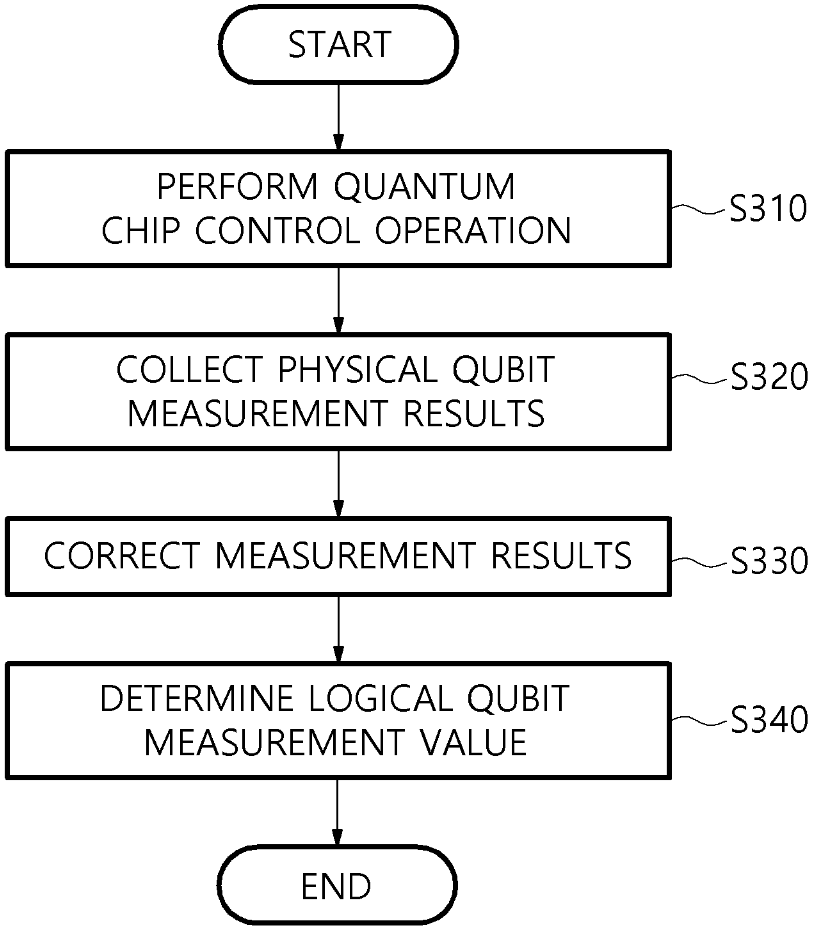
FIG. 12 is an operation flowchart illustrating a conversion process for generating the measurement results of logical qubits according to an embodiment of the present disclosure.

FIG. 12 is an operation flowchart illustrating a conversion process for generating the measurement results of logical qubits according to an embodiment of the present disclosure; and Referring to FIG. 12, a quantum chip control device 230 may request a physical qubit operation (quantum chip control operation) at step S310.

A physical measurement unit 225*a* may measure physical qubits in response to the request of the quantum chip control device 230 and collect the measurement results at step S320.

A physical layer Pauli frame unit 225*b* may correct the measurement results of the physical qubits based on a prestored operation at step S330.

A measurement result converter 214 may determine the measurement value of a logical qubit depending on the measurement results of all physical qubits constituting the logical qubit at step S340.

A logical layer Pauli frame unit 213*b* may store and manage Pauli operations for respective logical qubits.

The values of physical/logical qubits illustrated in FIG. 11 may be values for explaining a data conversion process, and may be represented differently depending on various components forming surface code.

The logical operation circuit according to an embodiment of the present disclosure may be changed depending on the configuration of each circuit because the method of surface code forming each logical qubit and a quantum circuit forming a lattice surgery operation are present as various schemes.

Furthermore, the Pauli frame processing rules in Table 4 may be modified in conformity with corresponding operations depending on the change of the circuit configuration.

Furthermore, various operators other than universal logical operators (gates) (e.g., Pauli, H, CNOT, S, and T) may be applied using the same rules to the present disclosure.

Furthermore, all modules of physical/logical layers proposed in the present disclosure may be reduced or integrated if necessary.

Furthermore, all layers and modules except for the quantum chip control device 230 according to the embodiment of the present disclosure may be implemented as classic computers or special-purpose hardware.

Figure 13:
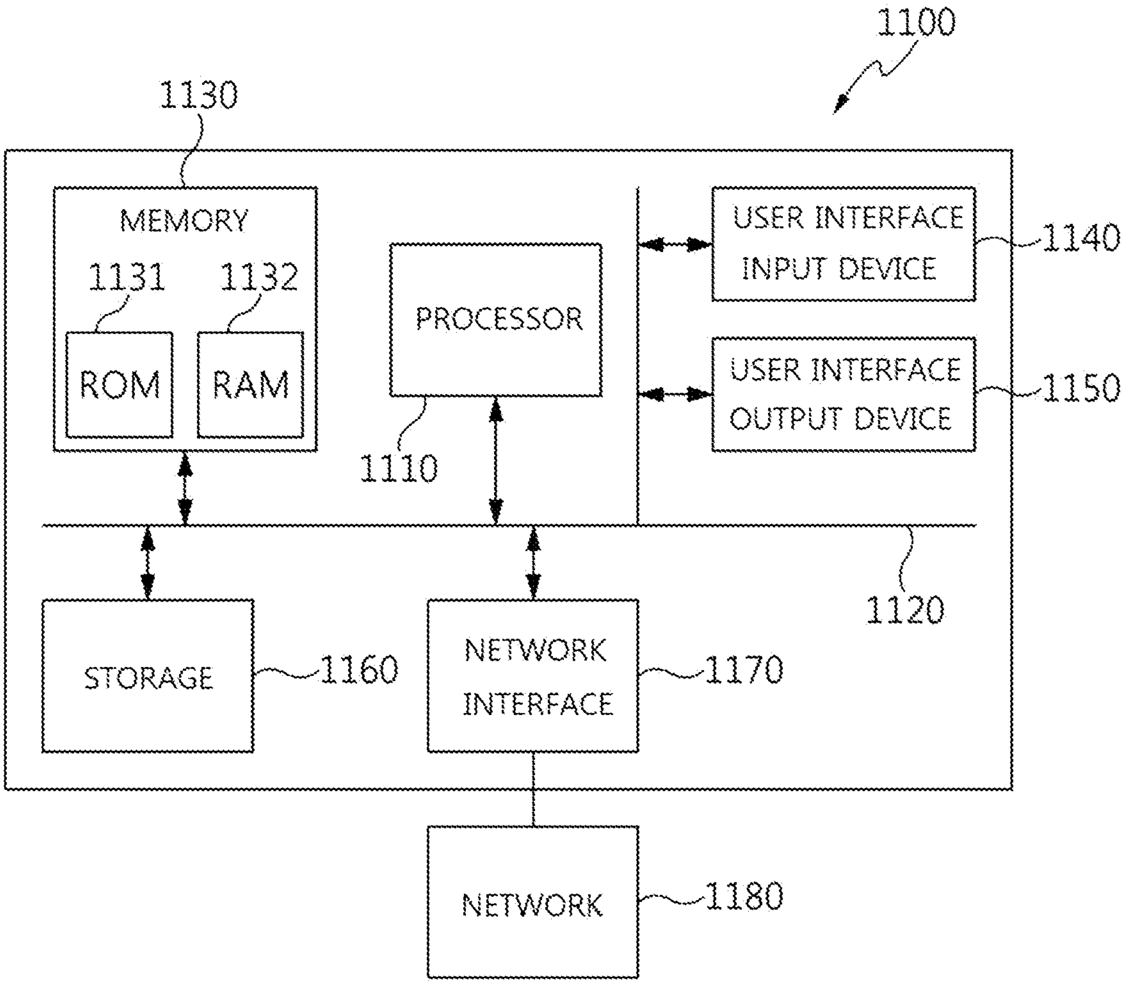
FIG. 13 is a diagram illustrating a computer system according to an embodiment of the present disclosure.

FIG. 13 is a diagram illustrating a computer system according to an embodiment of the present disclosure.

Referring to FIG. 13, a logical qubit execution apparatus according to embodiments of the present disclosure may be implemented in a computer system 1100 such as a computer-readable storage medium. As illustrated in FIG. 13, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each processor 1110 may be a Central Processing Unit (CPU) or a semiconductor device for executing processing instructions stored in the memory 1130 or the storage 1160. Each of the memory 1130 and the storage 1160 may be any of various types of volatile or nonvolatile storage media. For example, the memory 1130 may include Read-Only Memory (ROM) 1131 or Random Access Memory (RAM) 1132.

A logical qubit execution apparatus according to an embodiment of the present disclosure may include one or more processors 1110 and execution memory 1130 configured to store at least one program that is executed by the one or more processors, wherein the at least one program is configured to execute, by a logical execution layer, a quantum circuit including requested logical qubits using a lattice surgery operation, generate, by the logical execution layer, measurement results of the logical qubits by combining measurement results of logical Pauli frames, generate, by a physical execution layer, a physical qubit circuit by converting a logical qubit operation corresponding to the measurement results of the logical qubits into a physical qubit operation, and measure, by the physical execution layer, results of an operation on physical Pauli frames by executing the physical qubit circuit.

Here, the lattice surgery operation may include a first operation group for performing merge and split operations and a second operation group, execution or non-execution of which is determined based on a result of execution of the first operation group.

Here, the at least one program may be configured to, when execution of a Clifford operation is requested from the second operation group, determine whether a Pauli operation stored in the Pauli frames is present, and request the physical execution layer to execute the first operation group when it is determined that no Pauli operation is present in the Pauli frames.

Here, the at least one program may be configured to, when it is determined that the Pauli operation is present in the Pauli frames, delay execution of the Pauli operation based on a preset Pauli frame composition rule between the Pauli operation and the Clifford operation.

Here, the at least one program may be configured to change an execution priority of the Pauli operation to a priority lower than that of the Clifford operation and then delay execution of the Pauli operation.

Here, the at least one program may be configured to convert measurement results of physical qubits into measurement results of logical qubits based on operation results of the physical Pauli frames in the physical execution layer.

Here, the at least one program may be configured to store the operation on the physical Pauli frames as a Pauli operation of the logical Pauli frame based on the converted measurement results of the logical qubits.

The present disclosure may minimize an error rate in the operation execution process of a quantum computer.

Further, the present disclosure may minimize a system overhead occurring when physical qubits are encoded into logical qubits.

Furthermore, the present disclosure may provide a system architecture for multi-layering Pauli frames and a control method for effectively operating the system architecture.

Furthermore, the present disclosure may provide an efficient software operating layer for quantum computing operations.

As described above, in the logical qubit execution apparatus and method according to the present disclosure, the configurations and schemes in the above-described embodiments are not limitedly applied, and some or all of the above embodiments can be selectively combined and configured so that various modifications are possible.

What is claimed is:

1. A logical qubit execution apparatus, comprising:

one or more processors; and an execution memory configured to store at least one program that is executed by the one or more processors, wherein the at least one program is configured to:

execute, by a logical execution layer, a quantum circuit including requested logical qubits using a lattice surgery operation, generate, by the logical execution layer, measurement results of the logical qubits by combining measurement results of logical Pauli frames, generate, by a physical execution layer, a physical qubit circuit by converting a logical qubit operation corresponding to the measurement results of the logical qubits into a physical qubit operation, and measure, by the physical execution layer, results of an operation on physical Pauli frames by executing the physical qubit circuit, wherein the lattice surgery operation comprises a first operation group for performing merge and split operations and a second operation group, execution or non-execution of which is determined based on a result of execution of the first operation group, and wherein the at least one program is configured to, when execution of a Clifford operation is requested from the second operation group, determine whether a Pauli operation stored in the Pauli frames is present, and request the physical execution layer to execute the first operation group when it is determined that no Pauli operation is present in the Pauli frames.

2. The logical qubit execution apparatus of claim 1, wherein the at least one program is configured to, when it is determined that the Pauli operation is present in the Pauli frames, delay execution of the Pauli operation based on a preset Pauli frame composition rule between the Pauli operation and the Clifford operation.

3. The logical qubit execution apparatus of claim 2, wherein the at least one program is configured to change an execution priority of the Pauli operation to a priority lower than that of the Clifford operation and then delay execution of the Pauli operation.

4. The logical qubit execution apparatus of claim 1, wherein the at least one program is configured to convert measurement results of physical qubits into measurement results of logical qubits based on operation results of the physical Pauli frames in the physical execution layer.

5. The logical qubit execution apparatus of claim 4, wherein the at least one program is configured to store the operation on the physical Pauli frames as a Pauli operation of the logical Pauli frame based on the converted measurement results of the logical qubits.

6. A logical qubit execution method being performed by a logical qubit execution apparatus, the logical qubit execution method comprising:

executing, by a logical execution layer, a quantum circuit including requested logical qubits using a lattice surgery operation;

generating, by the logical execution layer, measurement results of the logical qubits by combining measurement results of logical Pauli frames;

generating, by a physical execution layer, a physical qubit circuit by converting a logical qubit operation corresponding to the measurement results of the logical qubits into a physical qubit operation; and measuring, by the physical execution layer, results of an operation on physical Pauli frames by executing the physical qubit circuit, wherein the lattice surgery operation comprises a first operation group for performing merge and split operations and a second operation group, execution or non-execution of which is determined based on a result of execution of the first operation group, and wherein executing the quantum circuit comprises:

when execution of a Clifford operation is requested from the second operation group, determining whether a Pauli operation stored in the Pauli frames is present, and requesting the physical execution layer to execute the first operation group when it is determined that no Pauli operation is present in the Pauli frames.

7. The logical qubit execution method of claim 6, wherein executing the quantum circuit further comprises:

when it is determined that the Pauli operation is present, delaying execution of the Pauli operation based on a preset Pauli frame composition rule between the Pauli operation and the Clifford operation.

8. The logical qubit execution method of claim 7, wherein executing the quantum circuit further comprises:

changing an execution priority of the Pauli operation to a priority lower than that of the Clifford operation and then delaying execution of the Pauli operation.

9. The logical qubit execution method of claim 6, further comprising:

converting measurement results of physical qubits into measurement results of logical qubits based on operation results of the physical Pauli frames in the physical execution layer.

10. The logical qubit execution method of claim 9, wherein converting the measurement results comprises:

store the operation on the physical Pauli frames as a Pauli operation of the logical Pauli frame based on the converted measurement results of the logical qubits.

* * * * *